(12) United States Patent
Ueno et al.

(10) Patent No.: US 11,626,824 B2
(45) Date of Patent: Apr. 11, 2023

(54) LINEAR CONVEYOR SYSTEM, A LINEAR MODULE, A CONTROL METHOD FOR A LINEAR MODULE

(71) Applicant: YAMAHA HATSUDOKI KABUSHIKI KAISHA, Iwata (JP)

(72) Inventors: Kenji Ueno, Iwata (JP); Takayoshi Fujita, Iwata (JP); Shunsuke Aoki, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 117 days.

(21) Appl. No.: 17/436,060

(22) PCT Filed: May 8, 2019

(86) PCT No.: PCT/JP2019/018327
§ 371 (c)(1),
(2) Date: Sep. 2, 2021

(87) PCT Pub. No.: WO2020/225862
PCT Pub. Date: Nov. 12, 2020

(65) Prior Publication Data
US 2022/0182002 A1 Jun. 9, 2022

(51) Int. Cl.
*H02K 41/00* (2006.01)
*H02K 41/02* (2006.01)
*H02P 25/064* (2016.01)

(52) U.S. Cl.
CPC ................ *H02P 25/064* (2016.02)

(58) Field of Classification Search
CPC .............. H02K 41/02; H02K 41/00

USPC ............... 310/12.01, 12.02, 12.12, 12.19
See application file for complete search history.

(56) References Cited

U.S. PATENT DOCUMENTS

RE39,747 E 7/2007 Peltier et al.

FOREIGN PATENT DOCUMENTS

| JP | 2013099208 A | * | 5/2013 | |
| WO | WO-2013069201 A1 | * | 5/2013 | ........... H02K 41/031 |
| WO | WO-2018055755 A1 | * | 3/2018 | ............. B65G 25/04 |

OTHER PUBLICATIONS

International Search Report issued in PCT/JP2019/018327; dated Aug. 13, 2019.

\* cited by examiner

*Primary Examiner* — Jose A Gonzalez Quinones
(74) *Attorney, Agent, or Firm* — Studebaker & Brackett PC

(57) ABSTRACT

The identifier for identifying the slider is given to this slider. In contrast, the control signal transmitted to the plurality of linear drivers indicates the position command value and the speed command value for the slider and the identifier of this slider in association with each other. The linear driver reads the identifier for identifying the slider from this slider overlapping the assigned region thereof and supplies the current corresponding to the position command value and the speed command value associated with this identifier by the control signal to the linear motor stators. In this way, it is possible to cause the linear driver corresponding to the assigned region, in which the slider is present, to precisely drive the slider.

20 Claims, 8 Drawing Sheets

| Sc | | | | |
|---|---|---|---|---|
| AXIS NUMBER | IDENTIFIER ID | COMMAND CODE | POSITION COMMAND VALUE Cp | SPEED COMMAND VALUE Cv |
| 1 | 10001 | 11 | P1 | V1 |
| 2 | 10002 | 11 | P2 | V2 |
| 3 | 10003 | 11 | P3 | V3 |
| 4 | 10004 | 11 | P4 | V4 |

LINEAR CONVEYOR SYSTEM, A LINEAR MODULE, A CONTROL METHOD FOR A LINEAR MODULE

CROSS-REFERENCE TO RELATED APPLICATION

This application is a National Stage of International Patent Application No. PCT/JP2019/018327, filed May 8, 2019, the entire contents of which is incorporated herein by reference.

BACKGROUND

Technical Field

This disclosure relates to a technique for driving a slider by linear modules.

Background Art

U.S. RE39,747E describes a linear module for driving a slider by a linear motor. That is, the slider includes a stator having a permanent magnet and the linear module includes a stator having an electromagnet. The linear module drives the slider by an electromagnetic interaction between the stator and the electromagnet caused by supplying a current to the electromagnet.

Particularly, in U.S. RE39,747E, a plurality of regions arranged in a driving direction of the slider are set, the linear module includes a plurality of drivers each having a section controller and a stator, and the plurality of drivers respectively correspond to the plurality of regions. Each driver drives the slider present in the assigned region.

SUMMARY

As just described, to drive the slider by the linear module in which the plurality of assigned regions are respectively provided for the plurality of drivers, the driver corresponding to the assigned region in which the slider is present needs to be caused to precisely drive the slider.

This disclosure was developed in view of the above, and aims to provide a technique enabling a driver corresponding to an assigned region, in which a slider is present, to precisely drive the slider in a linear module in which a plurality of the assigned regions are respectively provided in correspondence with the plurality of drivers.

A linear conveyor system according to the disclosure comprises a slider including a linear motor mover having a permanent magnet; a linear module including a plurality of drivers respectively arranged in correspondence with a plurality of assigned regions arranged in a driving direction of the slider, with each of the plurality of drivers being in charge of driving the slider overlapping the assigned region thereof in the driving direction; and a host control device which transmits a control signal to the drivers. The slider includes a storage storing an identifier to identify the slider. The control signal indicates a drive command for the slider and the identifier of the slider in association with each other. The driver includes a linear motor stator arranged in the assigned region corresponding to the driver and having an electromagnet, a reader reading the identifier from the storage of the slider overlapping the assigned region corresponding to the driver, and a drive controller supplying a current to the linear motor stator, the driver driving the slider overlapping the assigned region corresponding to the driver in the driving direction by the drive controller supplying a current corresponding to the drive command associated with the identifier read by the reader by the control signal to the linear motor stator.

A linear module according to the disclosure comprises a plurality of drivers respectively arranged in correspondence with a plurality of assigned regions arranged in a driving direction of a slider including a linear motor mover having a permanent magnet. Each of the plurality of drivers is in charge of driving the slider overlapping the assigned region thereof in the driving direction. The driver includes a linear motor stator arranged in the assigned region corresponding to the driver and having an electromagnet, a reader reading an identifier to identify the slider from the slider overlapping the assigned region corresponding to the driver, a drive controller supplying a current to the linear motor stator, and a communication processor receiving a control signal indicating a drive command for the slider and the identifier of the slider in association with each other, and drives the slider overlapping the assigned region corresponding to the driver in the driving direction by the drive controller supplying a current corresponding to the drive command associated with the identifier read by the reader by the control signal to the linear motor stator.

A control method according to the disclosure is a control method for a linear module including a plurality of drivers respectively arranged in correspondence with a plurality of assigned regions arranged in a driving direction of a slider including a linear motor mover having a permanent magnet. The driver includes a linear motor stator arranged in the assigned region corresponding to the driver and having an electromagnet. The control method comprises reading an identifier to identify the slider from the slider overlapping the assigned region corresponding to the driver by the driver; transmitting a control signal indicating a drive command for the slider and the identifier of the slider in association with each other to the driver; and driving the slider overlapping the assigned region corresponding to the driver in the driving direction by the driver supplying a current corresponding to the drive command associated with the identifier read from the slider by the control signal to the linear motor stator.

In the disclosure (linear conveyor system, linear module and control method for linear module) thus configured, the identifier for identifying the slider is given to the slider. In contrast, the control signal to be transmitted to the plurality of drivers indicates the drive command for the slider and the identifier of the slider in association with each other. The driver reads the identifier for identifying the slider from the slider overlapping the assigned region thereof, and supplies the current corresponding to the drive command associated with this identifier by the control signal to the linear motor stator. That is, out of the plurality of drivers, the driver corresponding to the assigned region overlapping the slider reads the identifier from the slider and drives the slider according to the drive command associated with this identifier. In this way, the driver corresponding to the assigned region in which the slider is present can be caused to precisely drive the slider.

The linear conveyor system may be configured so that the host control device transmits the same control signal to the plurality of drivers. In such a configuration, the host control device can cause the driver corresponding to the assigned region, in which the slider is present, to precisely drive the slider only by generating the control signal including the identifier of the slider to be controlled and the drive command and transmitting this control signal to the plurality of drivers. That is, the slider can be properly driven not by a control of specifying the linear driver, which should drive the slider, out of the plurality of linear drivers and transmitting the drive command to this specified linear driver, but by a simple control of transmitting the control signal to the plurality of linear drivers at once.

The linear conveyor system may be configured so that the linear module drives a plurality of the sliders using the plurality of drivers, the storage stores the identifier to identify each of the plurality of sliders, and the control signal indicates the drive command for the slider and the identifier of the slider serving as an object of the drive command in association with each other for each slider. In such a configuration, each of the plurality of sliders can be precisely driven by generating the control signal indicating the drive command and the identifier of the slider in association with each other for each of the plurality of sliders and transmitting the control signal to the plurality of drivers.

The linear conveyor system may be configured so that the driver tries reading of the identifier by the reader in a predetermined reading cycle and causes the drive controller to supply a current corresponding to the drive command associated with the identifier successfully read by the control signal to the linear motor stator. In such a configuration, since each driver tries the reading of the identifier in the predetermined reading cycle, the driver corresponding to the assigned region as a movement destination of the slider drives the slider if the assigned region overlapping the slider changes according to a movement of the slider. In this way, the driver for driving the slider can be changed according to the movement of the slider.

The linear conveyor system may be configured so that the control device transmits the control signal in a predetermined transmission cycle to the plurality of drivers and the reading cycle is shorter than the transmission cycle. In such a configuration, a change of the driver for driving the slider can precisely follow the movement of the slider.

The linear conveyor system may be configured so that the driver does not cause the drive controller to supply the current to the linear motor stator if the identifier is not read by the reader. In such a configuration, it is possible to suppress a movement disturbance of the slider and wasteful power consumption due to an unnecessary induced magnetic field generated because the driver corresponding to the assigned region not overlapping the slider supplies the current to the linear motor stator.

According to the disclosure, it is possible to enable a driver corresponding to an assigned region, in which a slider is present, to precisely drive the slider in a linear module in which a plurality of the assigned regions are respectively provided in correspondence with a plurality of the drivers.

DETAILED DESCRIPTION

Figure 1:
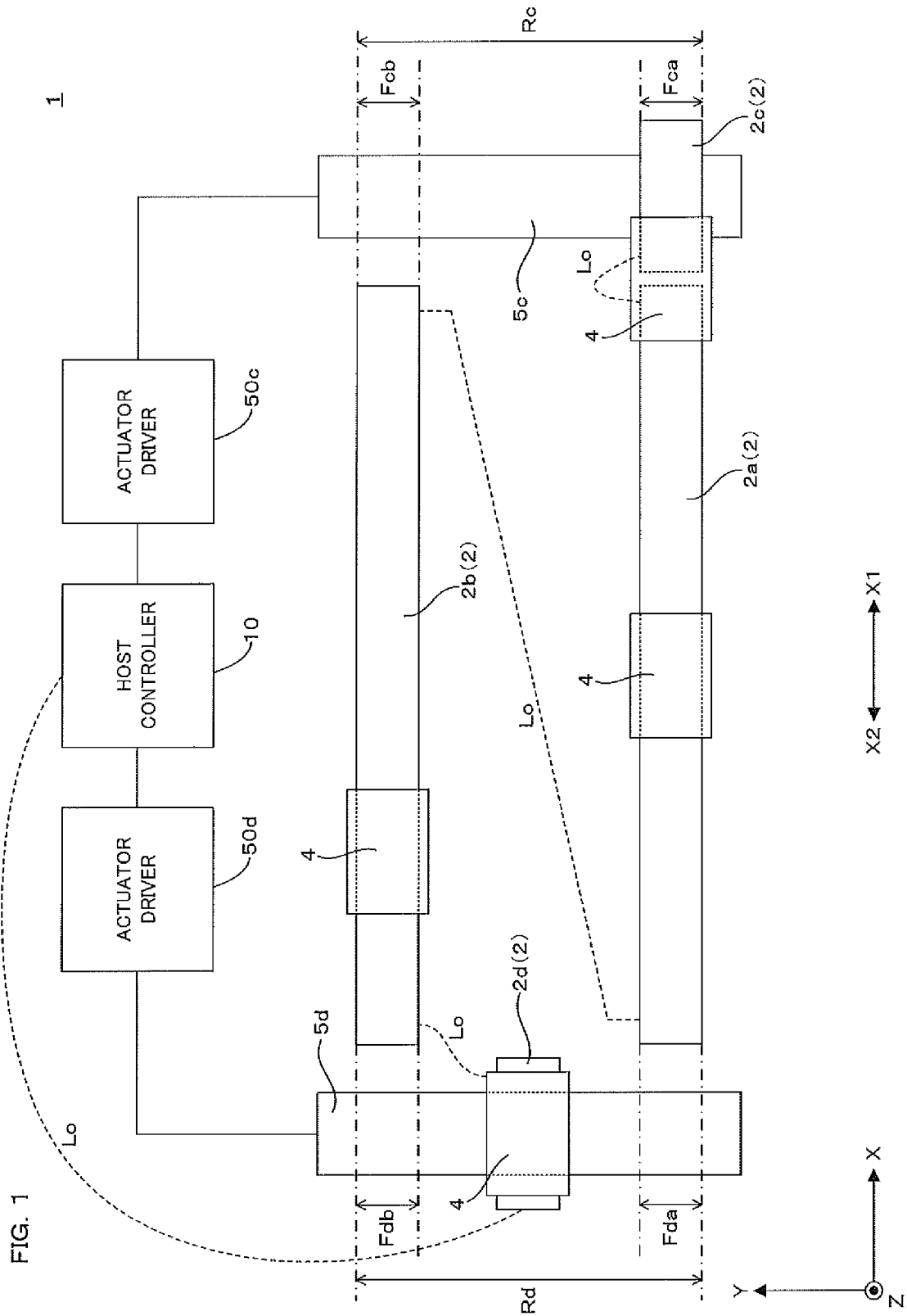
FIG. 1 is a view schematically showing an example of a linear conveyor system according to the disclosure.

FIG. 1 is a view schematically showing an example of a linear conveyor system according to the disclosure. In FIG. 1, XYZ orthogonal coordinate axes including an X direction parallel to a horizontal direction, a Y direction parallel to the horizontal direction while being orthogonal to the X direction and a Z direction parallel to a vertical direction are shown. Further, one side along the X direction is written as an X1 side and another side along the X direction opposite to the one side is written as an X2 side. Similar notations are also used as appropriate in the following drawings. The linear conveyor system 1 includes four linear modules 2. Note that mutually different signs 2a, 2b, 2c and 2d are given to the four linear modules 2 in FIG. 1.

The linear modules 2a, 2b are fixed linear modules fixed to an installation surface of the linear conveyor system 1, and the linear modules 2c, 2d are movable linear modules movable in the Y direction with respect to the installation surface. The fixed linear modules 2a, 2b and the movable linear modules 2c, 2d have different lengths in the X direction while having the same width in the Y direction. However, these have the common basic configuration described later using FIGS. 2-5 except the lengths in the X direction.

Two fixed linear modules 2a, 2b are arranged in parallel to the X direction while being spaced apart in the Y direction. The fixed linear modules 2a, 2b arranged in parallel to the X direction in this way have the same length in the X direction. On other hand, the movable linear modules 2c, 2d have the same length shorter than the fixed linear modules 2a, 2b in the X direction. However, a dimensional relationship of the movable linear modules 2c, 2d and the fixed linear modules 2a, 2b is not limited to this example.

Such a linear conveyor system 1 includes two actuators 5c, 5d which drives the movable linear modules 2c, 2d in the Y direction. The actuator 5c is arranged in parallel to the Y direction on the X1 sides of the fixed linear modules 2a, 2b in the X direction. The actuator 5d is arranged in parallel to the Y direction on the X2 sides of the fixed linear modules 2a, 2b in the X direction. In this way, the two actuators 5c, 5d are arranged to sandwich two fixed linear modules 2a, 2b in the X direction.

The actuator 5c is, for example, a single-axis robot including a ball screw parallel to the Y direction, and the movable linear module 2c is attached to a nut of the ball screw of the actuator 5c. This actuator 5c drives the movable linear module 2c in the Y direction along a movable region Rc. Here, the movable region Rc is a region extending in the Y direction and including a facing range Fca facing toward an end on the X1 side of the fixed linear module 2a from the X1 side in the X direction and a facing range Fcb facing toward an end on the X1 side of the fixed linear module 2b from the X1 side in the X direction.

The actuator 5d is, for example, a single-axis robot including a ball screw parallel to the Y direction, and the movable linear module 2d is attached to a nut of the ball screw of the actuator 5d. This actuator 5d drives the movable linear module 2d in the Y direction along a movable region Rd. Here, the movable region Rd is a region extending in the Y direction and including a facing range Fda facing toward an end on the X2 side of the fixed linear module 2a from the X2 side in the X direction and a facing range Fdb facing toward an end on the X2 side of the fixed linear module 2b from the X2 side in the X direction.

The linear conveyor system 1 also includes actuator drivers 50c, 50d to drive such actuators 5c, 5d. The actuator driver 50c drives the linear module 2c in the Y direction by supplying a current to a motor of the actuator 5c, and the actuator driver 50d drives the linear module 2d in the Y direction by supplying a current to a motor of the actuator 5d.

In such a linear conveyor system 1, the slider 4 can be circularly driven. For example, the fixed linear module 2a drives the slider 4 engaged therewith toward the X1 side in the X direction with the movable linear module 2c located in the facing range Fca, whereby the slider 4 can be moved from the fixed linear module 2a to the movable linear module 2c. Then, the movable linear module 2c located in the facing range Fcb drives the slider 4 engaged therewith toward the X2 side in the X direction after the actuator 5c moves the movable linear module 2c from the facing range Fca to the facing range Fcb, whereby the slider 4 can be moved from the movable linear module 2c to the fixed linear module 2b.

Further, the fixed linear module 2b drives the slider 4 engaged therewith toward the X2 side in the X direction with the movable linear module 2d located in the facing range Fdb, whereby the slider 4 can be moved from the fixed linear module 2b to the movable linear module 2d. Then, the movable linear module 2d located in the facing range Fda drives the slider 4 engaged therewith toward the X1 side in the X direction after the actuator 5d moves the movable linear module 2d from the facing range Fdb to the facing range Fda, whereby the slider 4 can be moved from the movable linear module 2d to the fixed linear module 2a.

In this way, the slider 4 can be circularly driven counterclockwise. Further, the slider 4 can be circularly driven clockwise by performing an operation opposite to the above one. Further, the circular drive is merely an example of a drive mode of the slider 4 executable by the linear conveyor system 1 and the slider 4 can be driven in various other modes.

Further, the linear conveyor system 1 includes a host controller 10 which integrally controls the drive of each linear module 2 (2a to 2d) and the actuators 5c, 5d. This host controller 10 is a computer provided with an arithmetic function necessary for control.

Figure 2:
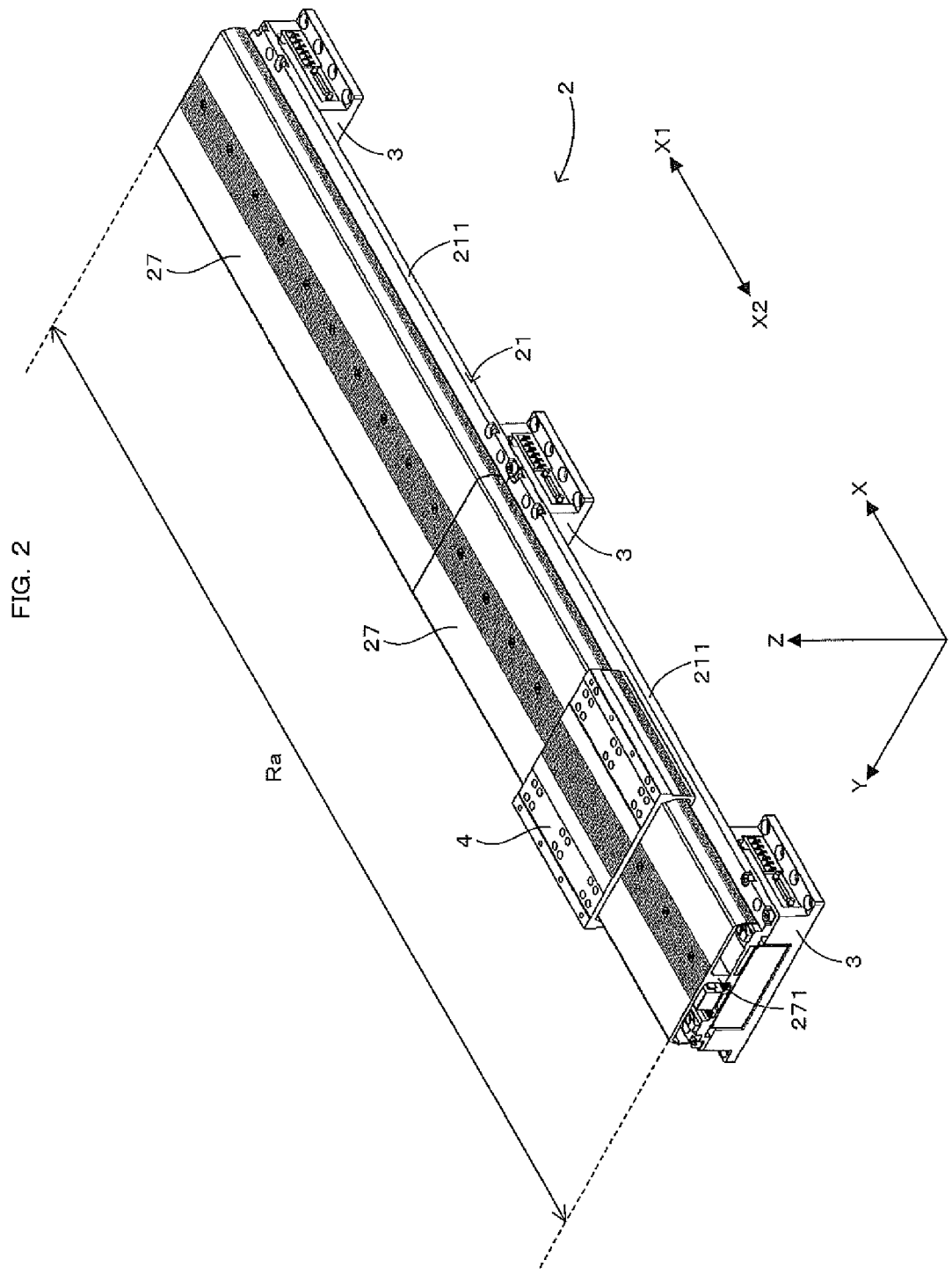
FIG. 2 is a perspective view showing an example of the linear module according to the disclosure.
Figure 3:
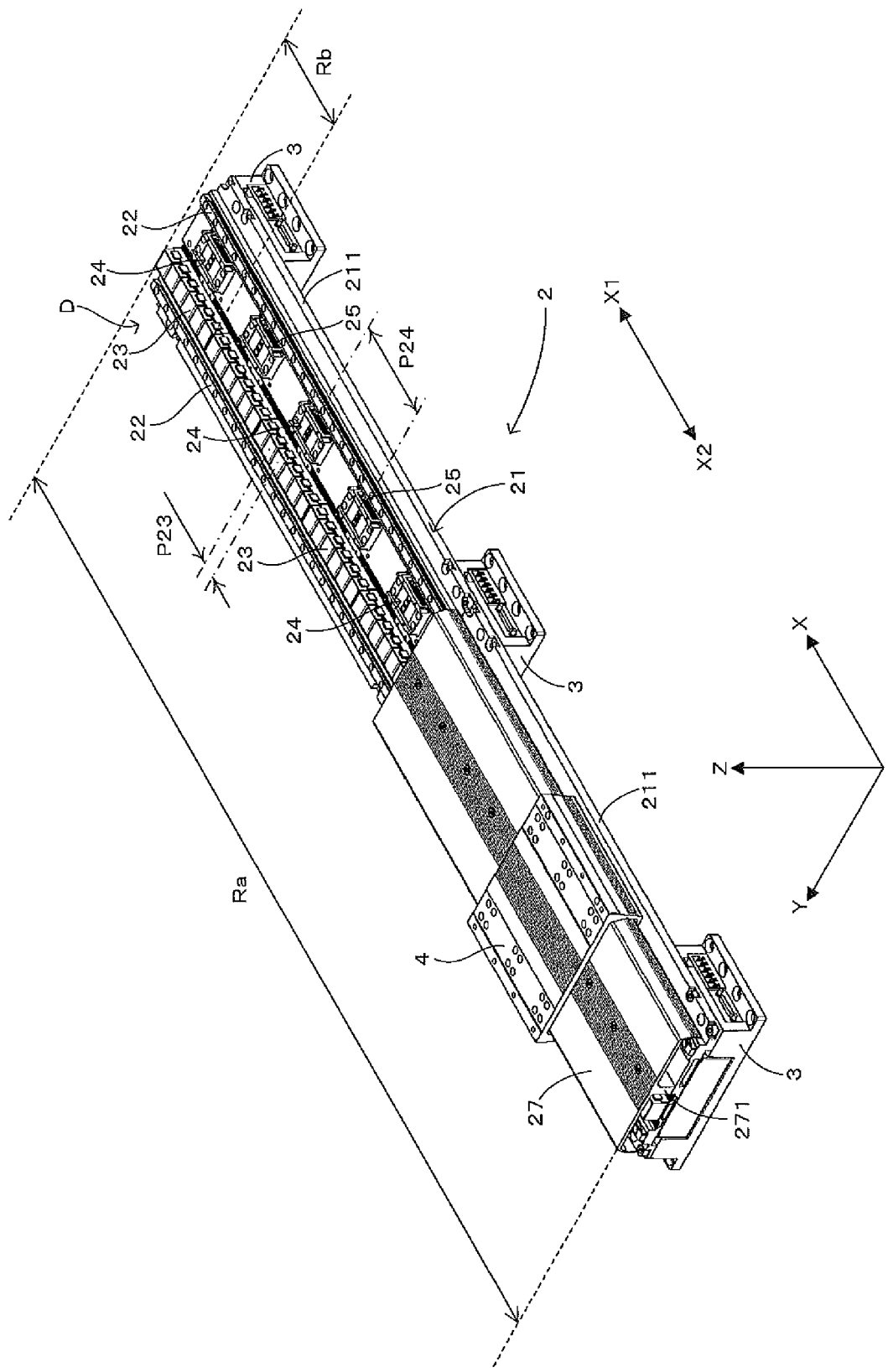
FIG. 3 is a perspective view of the linear module of FIG. 2 with the inside of the linear module partially exposed.
Figure 4:
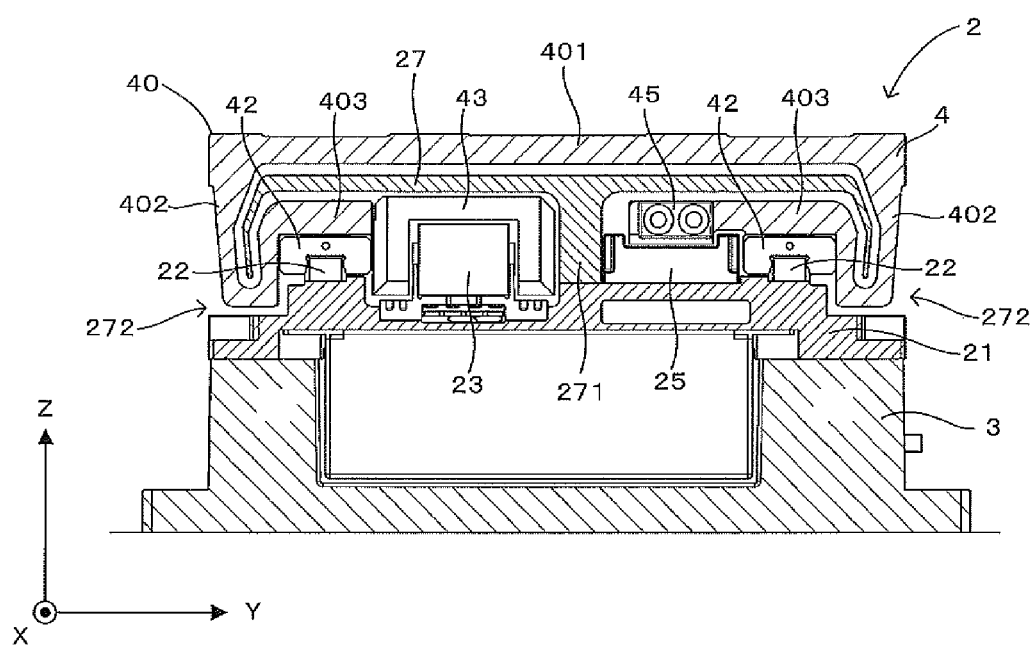
FIG. 4 is a partial sectional view of the linear module of FIG. 2 along the Y direction.
Figure 5:
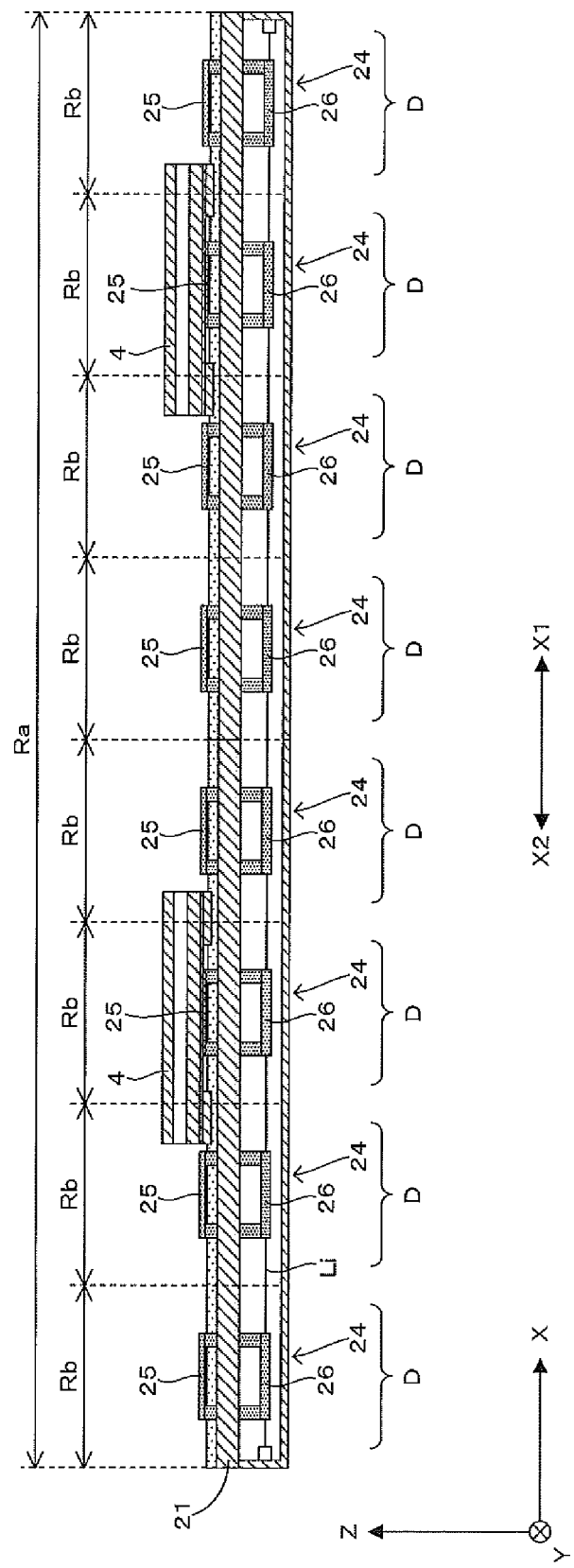
FIG. 5 is a partial sectional view of the linear module of FIG. 2 along the X direction.

FIG. 2 is a perspective view showing an example of the linear module according to the disclosure, FIG. 3 is a perspective view of the linear module of FIG. 2 with the inside of the linear module partially exposed, FIG. 4 is a partial sectional view of the linear module of FIG. 2 along the Y direction, and FIG. 5 is a partial sectional view of the linear module of FIG. 2 along the X direction. As described above, the linear modules 2a, 2b, 2c and 2d have the common basic configuration except the length in the X direction. Accordingly, these linear modules are expressed as the linear modules 2 without being particularly distinguished in FIGS. 2 to 5.

The linear module 2 extending in the X direction, base members 3 supporting the linear module 2 from below and a slider 4 engaged with the linear module 2 are shown in FIGS. 2 and 3. The linear module 2 is mounted on the upper ends of three base members 3 arranged at equal intervals in the X direction. Such a linear module 2 extends over a total length range Ra in the X direction (i.e. has a length of the total length range Ra) and the slider 4 engaged with the linear module 2 is movable in the X direction in this total length range Ra.

The linear module 2 includes a base plate 21 extending in the X direction. In this example, the base plate 21 is composed of two divided base plates 211 arrayed in the X direction. Out of the divided base plates 211, the divided base plate 211 on the X1 side is laid between the base member 3 on the X1 side end and the central base member 3, out of the three base members 3, and the divided base plate 211 on the X2 side is laid between the base member 3 on the X2 side end and the central base member 3, out of the three base members 3. The number of the module units 20 constituting the base plate 21 is not limited to two and may be one, three or more. Moreover, the length (total length range Ra) of the linear module 2 can be changed by changing the number of the divided base plates 211 constituting the base plate 21.

Such a base plate 21 has a rectangular shape in a plan view from the Z direction. Two guide rails 22 parallel to the X direction are mounted on the upper surface of the base plate 21 while being spaced apart in the Y direction and a plurality of linear motor stators 23 arranged in a row in the X direction at a predetermined arrangement pitch P23 are mounted on the upper surface of the base plate 21. In the Y direction, the plurality of linear motor stators 23 are arranged between the two guide rails 22. Each linear motor stator 23 is an electromagnet including a coil and a core inserted in the coil.

Further, a plurality of (eight) servo units 24 arranged in a row in the X direction at a predetermined arrangement pitch P24 are mounted on the base plate 21. In the Y direction, the plurality of servo units 24 are arranged between the plurality of linear motor stators 23 and one guide rail 22. Note that the arrangement pitch P24 of the servo units 24 is longer than the arrangement pitch P23 of the linear motor stators 23 and a plurality of the linear motor stators 23 are provided in correspondence with one servo unit 24.

Each of the plurality of servo units 24 includes a magnetic sensor 25 mounted on the upper surface of the base plate 21 and a driver board 26 mounted on the lower surface of the base plate 21. The magnetic sensor 25 is a position sensor which detects the position in the X direction of the slider 4. The driver board 26 is equipped with an electric circuit which executes a feedback control to supply a current corresponding to a detection result of the magnetic sensor 25 to the linear motor stators 23.

In such a linear module 2, the total length range Ra is equally divided in the X direction by the number of the servo units 24 to set as many assigned regions Rb as the servo units 24. That is, the total length range Ra is divided into a plurality of the assigned regions Rb and one servo unit 24 is arranged in each assigned region Rb. Further, the plurality of linear motor stators 23 provided in correspondence with one servo unit 24 as described above are arranged in each assigned region Rb.

As just described, one linear driver D including one servo unit 24 (in other words, one magnetic sensor 25 and one driver board 26) and the plurality of linear motor stators 23 corresponding to this servo unit 24 is arranged in each assigned region Rb, and a plurality of (eight) linear drivers D are arranged at equal intervals in the X direction in the total length range Ra.

Further, the linear module 2 includes a cover member 27 having a rectangular shape in a plan view for covering the guide rails 22 and the linear drivers D from above. The cover member 27 includes a support leg 271 projecting downward in a center in the Y direction, and the support leg 271 is mounted on the upper surface of the base plate 21. Clearances 272 are formed between the cover member 27 and the base plate 21 on both ends in the Y direction.

The slider 4 includes a slider housing 40. This slider housing 40 includes an upper plate 401 for covering the cover member 27 of the linear module 2 from above, side plates 402 extending downward from ends in the Y direction of the upper plate 401 and flanges 403 configured to enter between the cover member 27 and the base plate 21 via the clearances 272 from the lower ends of the side plates 402. Engaging members 42 are mounted on the lower surfaces of the flanges 403 and engaged with the linear motor stators 23. In this way, a movement of the slider 4 is guided in the X direction by the guide rails 22.

Further, the slider 4 includes linear motor movers 43 mounted on the slider housing 40 to face the linear motor stators 23. This linear motor mover 43 includes a permanent magnet and a back yoke for holding the permanent magnet. The slider 4 further includes a magnetic scale 45 mounted on the slider housing 40 to face the magnetic sensors 25. This magnetic scale 45 indicates the position in the X direction of the slider 4.

Such a slider 4 can be engaged with the guide rails 22 of the linear module 2 by entering toward a central side of the linear module 2 from an end of the linear module 2 in the X direction. Further, the slider 4 can be disengaged from the guide rails 22 of the linear module 2 by exiting outside from an end of the linear module 2 in the X direction.

In the linear module 2 thus configured, the drive of the slider 4 is shared and performed by the plurality of linear drivers D. That is, the linear motor stators 23 of each linear driver D can apply an electromagnetic drive force to the linear motor mover 43 of the slider 4 overlapping the assigned region Rb in which those linear motor stators 23 are arranged, but cannot apply an electromagnetic drive force to the linear motor movers 43 of the slider 4 not overlapping the assigned region Rb. Accordingly, each of the plurality of linear drivers D is in charge of the drive of the slider 4 overlapping the assigned region Rb in which the linear driver D is arranged, out of the total length range Ra. Next, the drive of the slider 4 by the linear drivers D is described.

Figure 6:
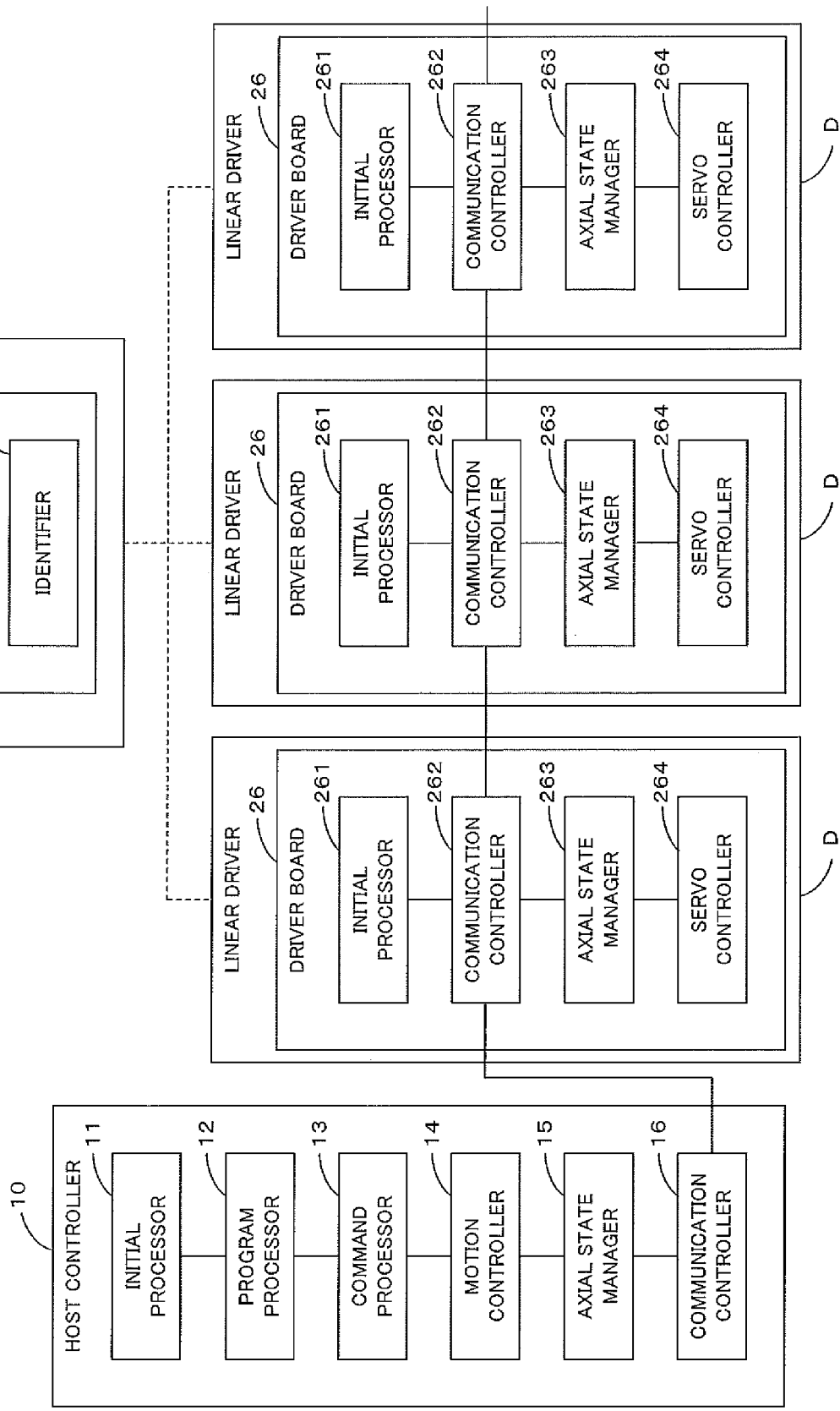
FIG. 6 is a block diagram showing an electrical configuration of the linear conveyor system of FIG. 1.
Figures 7, 8:
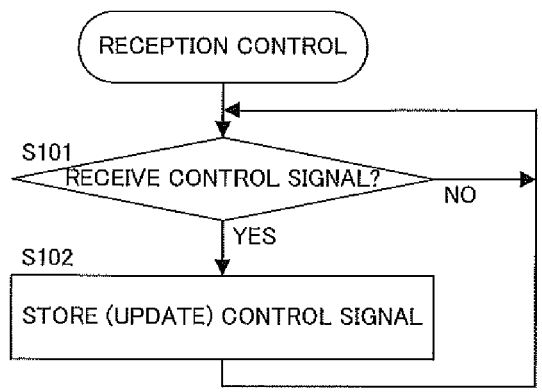
FIG. 7 is a chart showing a control signal to be generated by the host controller.
FIG. 8 is a flow chart showing the reception control executed by the linear driver.

FIG. 6 is a block diagram showing an electrical configuration of the linear conveyor system of FIG. 1, and FIG. 7 is a chart showing a control signal to be generated by the host controller. As shown in FIG. 6, the host controller 10 includes an initial processor 11, a program processor 12, a command processor 13, a motion controller 14, an axial state manager 15 and a communication controller 16. Out of these, the functional components 11 to 15 are realized by a processor such as a CPU (Central Processing Unit) provided in the host controller 10.

The initial processor 11 performs the initial setting of the linear conveyor system 1 when power is turned on. This initial setting includes the setting of identifiers ID for identifying the plurality of slider 4. That is, different identifiers ID are respectively given to the plurality of sliders 4 provided in the linear conveyor system 1, and these sliders 4 are identified by the identifiers ID. The identifier ID for identifying the slider 4 is stored (magnetized) in the magnetic scale 45 of the slider 4. In contrast, the initial processor 11 performs a managing process to associate one target slider 4 with the identifier ID read from the magnetic scale 45 of the target slider 4 by the magnetic sensor 25 of the driver D arranged in the assigned region Rb overlapping the target slider 4 for all the sliders 4 while changing the target slider 4 among the plurality of sliders 4. In this way, the identifier ID of the slider 4 is set. Note that the identifiers ID are managed in association with axis numbers successively assigned to the plurality of sliders 4.

The program processor 12 holds a program for defining a movement of each slider 4. This program is generated by a user using, for example, a PLC (Programmable Logic Controller) or the like, and installed in the program processor 12. The command processor 13 generates a movement command for moving the slider 4 as defined by the program, and the motion controller 14 generates command values (position command value Cp, speed command value Cv) for causing the linear driver D to move the slider 4 according to the movement command generated by the command processor 13.

In this way, a control signal Sc shown in FIG. 7 is generated. This control signal Sc indicates the identifier ID of the slider 4 and the position command value Cp and the speed command value Cv for this slider 4 in association with each other for each slider 4. That is, the control signal Sc indicates a command for driving the slider 4 identified by the identifier ID in accordance with the position command value Cp and the speed command value Cv associated with the identifier ID for each of the plurality of sliders 4. Note that a command code is a code indicating the type of a command given to the slider 4. Such a control signal Sc is a signal in which pieces of data including the identifier ID, the command code, the position command value Cp and the speed command value Cv are arranged successively in the order of the axis numbers of the sliders 4, and is transmitted to all the linear driver D equipped in the linear conveyor system 1 by serial communication.

The axial state manager 15 manages a state of each of the plurality of sliders 4 (axes). Specifically, the axial state manager 15 performs a managing process to associate one target slider 4 with the position (state of axes) of the target slider 4, the position being read from the magnetic scale 45 of the target slider 4 by the magnetic sensor 25 of the driver D arranged in the assigned region Rb overlapping the target slider 4, for all the sliders 4 while changing the target slider 4 among the plurality of sliders 4.

The communication controller 16 controls the communication of the host controller 10 and the linear drivers D of the linear modules 2. The transmission of the control signal Sc to the linear drivers D and the acquisition of the axial states from the linear drivers D are performed by the communication controller 16.

In contrast, the driver board 26 of each linear driver D includes an initial processor 261, a communication controller 262, an axial state manager 263 and a servo controller 264. The initial processor 261 performs the initial setting of the linear drivers D when power is turned on. The communication controller 262 controls the communication of the host controller 10 and the other linear drivers D with the communication controller 262.

The axial state manager 263 manages the position (state) of the slider 4 (axis). Specifically, the axial state manager 263 causes the magnetic sensor 25 to periodically try the reading of the identifier ID and the position indicated by the magnetic scale 45 of the slider 4. If the reading succeeds, the identifier ID and the position of the slider 4 are stored in association with each other, and are transmitted to the host controller 10 via the communication controller 262. Then, the axial state manager 15 of the host controller 10 manages these as described above.

The servo controller 264 executes a servo control for the drive of the slider 4 overlapping the assigned region Rb.

That is, the servo controller 264 drives the slider 4 by the servo control for controlling a current supplied to the linear motor stators 23 based on deviations between the position command value Cp and the speed command value Cv received from the host controller 10 and the position and speed of the slider 4 read by the magnetic sensor 25.

The plurality of linear drivers D provided in the linear conveyor system 1 are serially connected. Specifically, as indicated by broken lines of FIG. 1, the linear modules 2d, 2b, 2a and 2c are serially connected in this order by a wiring Lo. Further, in each linear module 2, the respective linear drivers D are serially connected by a wiring Li as shown in FIG. 5. In contrast, the host controller 10 transmits a control signal Sc (FIG. 7) common to the respective linear drivers D to paths of the wirings Lo, Li serially connecting the plurality of linear drivers D without distinguishing the individual linear drivers D. In this way, the control signal Sc successively passes through the plurality of linear drivers D. On the other hand, each linear driver D drives the slider 4 based on the received control signal Sc. The details of a reception control and a drive control as just described are as follows.

FIG. 8 is a flow chart showing the reception control executed by the linear driver. Note that since each of the plurality of linear drivers D commonly performs the flow chart of FIG. 8, the reception control is described here, taking one linear driver D as an example.

In Step S101, the communication controller 262 confirms whether or not a control signal Sc has been received from the axial state manager 15 of the host controller 10. The control signal Sc is transmitted in a predetermined transmission cycle Ts from the host controller 10. When the control signal Sc is received ("YES" in Step S101), this control signal Sc is stored in a memory of the servo controller 264 (Step S102). In this way, every time the control signal Sc is received, the control signal Sc stored in the initial processor 261 is updated.

Figure 9:
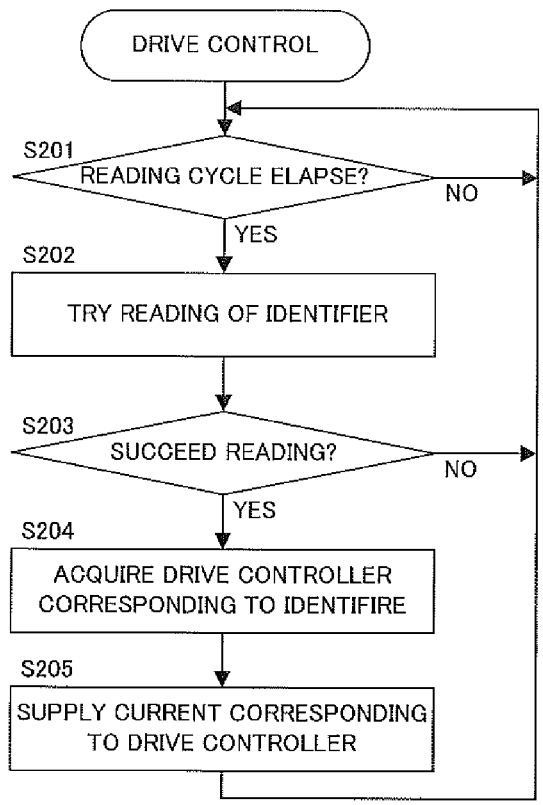
FIG. 9 is a flow chart showing the drive control executed by the linear driver.

FIG. 9 is a flow chart showing the drive control executed by the linear driver. Note that since each of the plurality of linear drivers D commonly performs the flow chart of FIG. 9, the drive control is described here, taking one linear driver D as an example.

In Step S201, the axial state manager 263 confirms whether or not a predetermined reading cycle Tr has elapsed. Note that the reading cycle Tr is shorter than the transmission cycle Ts. When the reading cycle Tr elapses ("YES" in Step S201), the axial state manager 263 causes the magnetic sensor 25 to try the reading of the identifier ID from the slider 4 (Step S202). In Step S203, the axial state manager 263 confirms whether or not the reading of the identifier ID has succeeded.

If none of the sliders 4 overlaps the assigned region Rb corresponding to the linear driver D, the magnetic scale 45 facing the magnetic sensor 25 arranged in this assigned region Rb is not present. As a result, the identifier ID cannot be read ("NO" in Step S203) and return is made to Step S201. On the other hand, if any one of the sliders 4 overlaps the assigned region Rb corresponding to this linear driver D, the magnetic scale 45 of this slider 4 faces the magnetic sensor 25 arranged in this assigned region Rb. As a result, the reading of the identifier ID from this slider 4 succeeds ("YES" in Step S203).

If the reading of the identifier ID succeeds in this way, the servo controller 264 reads the position command value Cp and the speed command value Cv corresponding to the identifier ID read by the axial state manager 263 from the control signal Sc stored in Step S102 (Step S204). Then, the servo controller 264 controls a current supplied to the linear motor stators 23 by the feedback control (servo control) based on deviations between the position command value Cp and the speed command value Cv and the position and speed of the slider 4 read by the magnetic sensor 25 (Step S205). In this way, the slider 4 is driven according to the position command value Cp and the speed command value Cv. Such a process is performed in every reading cycle Tr in the linear driver D.

In the embodiment described above, the identifier ID for identifying the slider 4 is given to this slider 4. In contrast, the control signal Sc transmitted to the plurality of linear drivers D indicates the position command value Cp and the speed command value Cv for the slider 4 and the identifier ID of this slider 4 in association with each other (FIG. 7). Then, the linear driver D reads the identifier ID for identifying the slider 4 from this slider 4 overlapping the assigned region Rb thereof (Steps S202, S203) and supplies the current corresponding to the position command value Cp and the speed command value Cv associated with this identifier ID by the control signal Sc to the linear motor stators 23 (Steps S204, S205). That is, out of the plurality of linear drivers D, the linear driver D corresponding to the assigned region Rb overlapping the slider 4 reads the identifier ID from the slider 4 and drives the slider 4 according to the position command value Cp and the speed command value Cv associated with this identifier ID. In this way, it is possible to cause the linear driver D corresponding to the assigned region Rb, in which the slider 4 is present, to precisely drive the slider 4.

As just described, the linear driver D autonomously judges that the linear driver D itself is in charge of the drive of the slider 4 in the case of reading the identifier ID from the slider 4 and executes the servo control for the slider 4. Thus, the host controller 10 needs not judge which of the plurality of linear drivers D is caused to control the drive of the slider 4 and may only generate and transmit the position command value CP and the speed command value Cv for the slider 4.

Further, the host controller 10 transmits the same control signal Sc (FIG. 7) to the plurality of linear driver D. In such a configuration, the host controller 10 can cause the linear driver D corresponding to the assigned region Rb, in which the slider 4 is present, to precisely drive the slider 4 only by generating the control signal Sc including the identifier ID, the position command value Cp and the speed command value Cv of the slider 4 to be controlled and transmitting this control signal Sc to the plurality of linear drivers D. That is, the slider 4 can be properly driven not by a control of specifying the linear driver D, which should drive the slider 4, out of the plurality of linear drivers D and transmitting the position command value Cp and the speed command value Cv to this specified linear driver D, but by a simple control of transmitting the control signal Sc to the plurality of linear drivers D at once.

Further, in the linear conveyor system 1, the plurality of linear drivers D are equipped and the plurality of sliders 4 can be individually driven using the plurality of linear drivers D. Further, the magnetic scale 45 of each slider 4 stores the identifier ID for identifying each of the plurality of sliders 4. The control signal Sc indicates the position command value Cp and the speed command value Cv for the slider 4 and the identifier ID of the slider 4 serving as an object of these command values Cp, Cv in association with each other for each slider 4 (FIG. 7). In such a configuration, each of the plurality of sliders 4 can be precisely driven by generating the control signal Sc indicating the command values Cp, Cv and the identifier ID of this slider 4 in association with each other for each of the plurality of sliders 4 and transmitting the control signal Sc to the plurality of linear drivers D.

Further, the linear driver D tries the reading of the identifier ID by the magnetic sensor 25 in the predetermined reading cycle Tr (Steps S201, S202). Then, the current corresponding to the position command value Cp and the speed command value Cv associated with the successfully read identifier ID by the control signal Sc is supplied to the linear motor stators 23 by the driver board 26 (Steps S204, S205). In such a configuration, since each linear driver D tries the reading of the identifier ID in the predetermined reading cycle Tr, the linear driver D corresponding to the assigned region Rb as a movement destination of the slider 4 drives the slider 4 if the assigned region Rb overlapping the slider 4 changes according to a movement of the slider 4. In this way, the linear driver D for driving the slider 4 can be changed according to the movement of the slider 4.

Further, the reading cycle Tr is shorter than the transmission cycle Tr in which the host controller 10 transmits the control signal Sc to the plurality of linear drivers D. In such a configuration, a change of the linear driver D for driving the slider 4 can precisely follow the movement of the slider 4.

Further, the linear driver D does not cause the driver board 26 to supply the current to the linear motor stators 23 if the identifier ID cannot be read by the magnetic sensor 25 ("NO" in Step S203). In such a configuration, it is possible to suppress a movement disturbance of the slider 4 and wasteful power consumption due to an unnecessary induced magnetic field generated because the linear driver D corresponding to the assigned region Rb not overlapping the slider 4 supplies the current to the linear motor stators 23.

As just described, in this embodiment, the linear conveyor system 1 corresponds to an example of a "linear conveyor system" of the disclosure, the host controller 10 corresponds to an example of a "host control device" of the disclosure, the linear module 2 corresponds to an example of a "linear module" of the disclosure, the linear motor stator 23 corresponds to an example of a "linear motor stator" of the disclosure, the magnetic sensor 25 corresponds to an example of a "reader" of the disclosure, the driver board 26 corresponds to an example of a "drive controller" of the disclosure, the slider 4 corresponds to an example of a "slider" of the disclosure, the linear motor mover 43 corresponds to an example of a "linear motor mover" of the disclosure, the magnetic scale 45 corresponds to an example of a "storage" of the disclosure, the position command value Cp and the speed command value Cv correspond to examples of a "drive command" of the disclosure, the linear driver D corresponds to an example of a "driver" of the disclosure, the identifier ID corresponds to an example of an "identifier" of the disclosure, the assigned region Rb corresponds to an example of an "assigned region" of the disclosure, the control signal Sc corresponds to an example of a "control signal" of the disclosure, the reading cycle Tr corresponds to an example of a "reading cycle" of the disclosure, the transmission cycle Ts corresponds to an example of a "transmission cycle" of the disclosure, and the X direction corresponds to an example of a "driving direction" of the disclosure.

Note that the disclosure is not limited to the above embodiment and various changes other than the aforementioned ones can be made without departing from the gist of the disclosure. For example, each linear driver D stores/updates the control signal Sc every time receiving the control signal Sc (FIG. 7). However, each linear driver D may store/update the control signal Sc if the slider 4 overlaps the assigned region Rb thereof, whereas each linear driver D may not store/update the control signal Sc if the slider 4 does not overlap the assigned region Rb thereof.

Further, the number and arrangement of the linear modules 2 may be changed as appropriate.

Further, the drive mode of the slider 4 in the linear conveyor system 1 is not limited to circular drive and may be linear drive of linearly driving the slider 4 in a predetermined direction.

The specific configurations, e.g. the shapes, dimensions or the like of the linear modules 2 and the sliders 4 may be changed.

Further, the identifier ID may be optically or electrically read from the slider 4 rather than being magnetically read.

What is claimed is:

1. A linear conveyor system, comprising:
    a slider including a linear motor mover having a permanent magnet;
    a linear module including a plurality of drivers respectively arranged in correspondence with a plurality of assigned regions arranged in a driving direction of the slider, each of the plurality of drivers being in charge of driving the slider overlapping the assigned region thereof in the driving direction; and
    a host controller configured to transmit a control signal to the drivers,
    wherein:
    the slider includes a storage configured to store an identifier to identify the slider,
    the control signal indicates a drive command for the slider and the identifier of the slider in association with each other, and
    the driver includes a linear motor stator arranged in the assigned region corresponding to the driver and having an electromagnet, a reader configured to read the identifier from the storage of the slider overlapping the assigned region corresponding to the driver and a drive controller configured to supply a current to the linear motor stator, the driver being configured to drive the slider overlapping the assigned region corresponding to the driver in the driving direction by the drive controller supplying a current corresponding to the drive command associated with the identifier read by the reader by the control signal to the linear motor stator.

2. The linear conveyor system according to claim 1, wherein the host controller is configured to transmit the same control signal to the plurality of drivers.

3. The linear conveyor system according to claim 1, wherein:
    the linear module is configured to drive a plurality of the sliders using the plurality of drivers,
    the storage is configured to store the identifier to identify each of the plurality of sliders, and
    the control signal indicates the drive command for the slider and the identifier of the slider serving as an object of the drive command in association with each other for each slider.

4. The linear conveyor system according to claim 1, wherein the driver is configured to attempt reading of the identifier by the reader in a predetermined reading cycle and cause the drive controller to supply a current corresponding to the drive command associated with the identifier successfully read by the control signal to the linear motor stator.

5. The linear conveyor system according to claim 4, wherein the host controller is configured to transmit the control signal in a predetermined transmission cycle to the plurality of drivers and the reading cycle is shorter than the transmission cycle.

6. The linear conveyor system according to claim 1, wherein the driver is configured to refrain from causing the drive controller to supply the current to the linear motor stator if the identifier is not read by the reader.

7. A linear module, comprising a plurality of drivers respectively arranged in correspondence with a plurality of assigned regions arranged in a driving direction of a slider including a linear motor mover having a permanent magnet, wherein:
   each of the plurality of drivers is in charge of driving the slider overlapping the assigned region thereof in the driving direction, and
   the driver includes
      a linear motor stator arranged in the assigned region corresponding to the driver and having an electromagnet,
      a reader configured to read an identifier to identify the slider from the slider overlapping the assigned region corresponding to the driver,
      a drive controller configured to supply a current to the linear motor stator, and
      a communication processor configured to receive a control signal indicating a drive command for the slider and the identifier of the slider in association with each other, and drive the slider overlapping the assigned region corresponding to the driver in the driving direction by the drive controller supplying a current corresponding to the drive command associated with the identifier read by the reader by the control signal to the linear motor stator.

8. A control method for a linear module including a plurality of drivers respectively arranged in correspondence with a plurality of assigned regions arranged in a driving direction of a slider including a linear motor mover having a permanent magnet, the driver including a linear motor stator arranged in the assigned region corresponding to the driver and having an electromagnet, the control method comprising:
   reading an identifier to identify the slider from the slider overlapping the assigned region corresponding to the driver by the driver;
   transmitting a control signal indicating a drive command for the slider and the identifier of the slider in association with each other to the driver; and
   driving the slider overlapping the assigned region corresponding to the driver in the driving direction by the driver supplying a current corresponding to the drive command associated with the identifier read from the slider by the control signal to the linear motor stator.

9. The linear conveyor system according to claim 2, wherein:
   the linear module is configured to drive a plurality of the sliders using the plurality of drivers,
   the storage is configured to store the identifier to identify each of the plurality of sliders, and
   the control signal indicates the drive command for the slider and the identifier of the slider serving as an object of the drive command in association with each other for each slider.

10. The linear conveyor system according to claim 2, wherein the driver is configured to attempt reading of the identifier by the reader in a predetermined reading cycle and cause the drive controller to supply a current corresponding to the drive command associated with the identifier successfully read by the control signal to the linear motor stator.

11. The linear conveyor system according to claim 3, wherein the driver is configured to attempt reading of the identifier by the reader in a predetermined reading cycle and cause the drive controller to supply a current corresponding to the drive command associated with the identifier successfully read by the control signal to the linear motor stator.

12. The linear conveyor system according to claim 9, wherein the driver is configured to attempt reading of the identifier by the reader in a predetermined reading cycle and cause the drive controller to supply a current corresponding to the drive command associated with the identifier successfully read by the control signal to the linear motor stator.

13. The linear conveyor system according to claim 10, wherein the host controller is configured to transmit the control signal in a predetermined transmission cycle to the plurality of drivers and the reading cycle is shorter than the transmission cycle.

14. The linear conveyor system according to claim 11, wherein the host controller is configured to transmit the control signal in a predetermined transmission cycle to the plurality of drivers and the reading cycle is shorter than the transmission cycle.

15. The linear conveyor system according to claim 12, wherein the host controller is configured to transmit the control signal in a predetermined transmission cycle to the plurality of drivers and the reading cycle is shorter than the transmission cycle.

16. The linear conveyor system according to claim 2, wherein the driver is configured to refrain from causing the drive controller to supply the current to the linear motor stator if the identifier is not read by the reader.

17. The linear conveyor system according to claim 3, wherein the driver is configured to refrain from causing the drive controller to supply the current to the linear motor stator if the identifier is not read by the reader.

18. The linear conveyor system according to claim 4, wherein the driver is configured to refrain from causing the drive controller to supply the current to the linear motor stator if the identifier is not read by the reader.

19. The linear conveyor system according to claim 5, wherein the driver is configured to refrain from causing the drive controller to supply the current to the linear motor stator if the identifier is not read by the reader.

20. The linear conveyor system according to claim 9, wherein the driver is configured to refrain from causing the drive controller to supply the current to the linear motor stator if the identifier is not read by the reader.

* * * * *